S. TITCOMB.
Bee Hive.
No. 6,285.
Patented April 10, 1849.
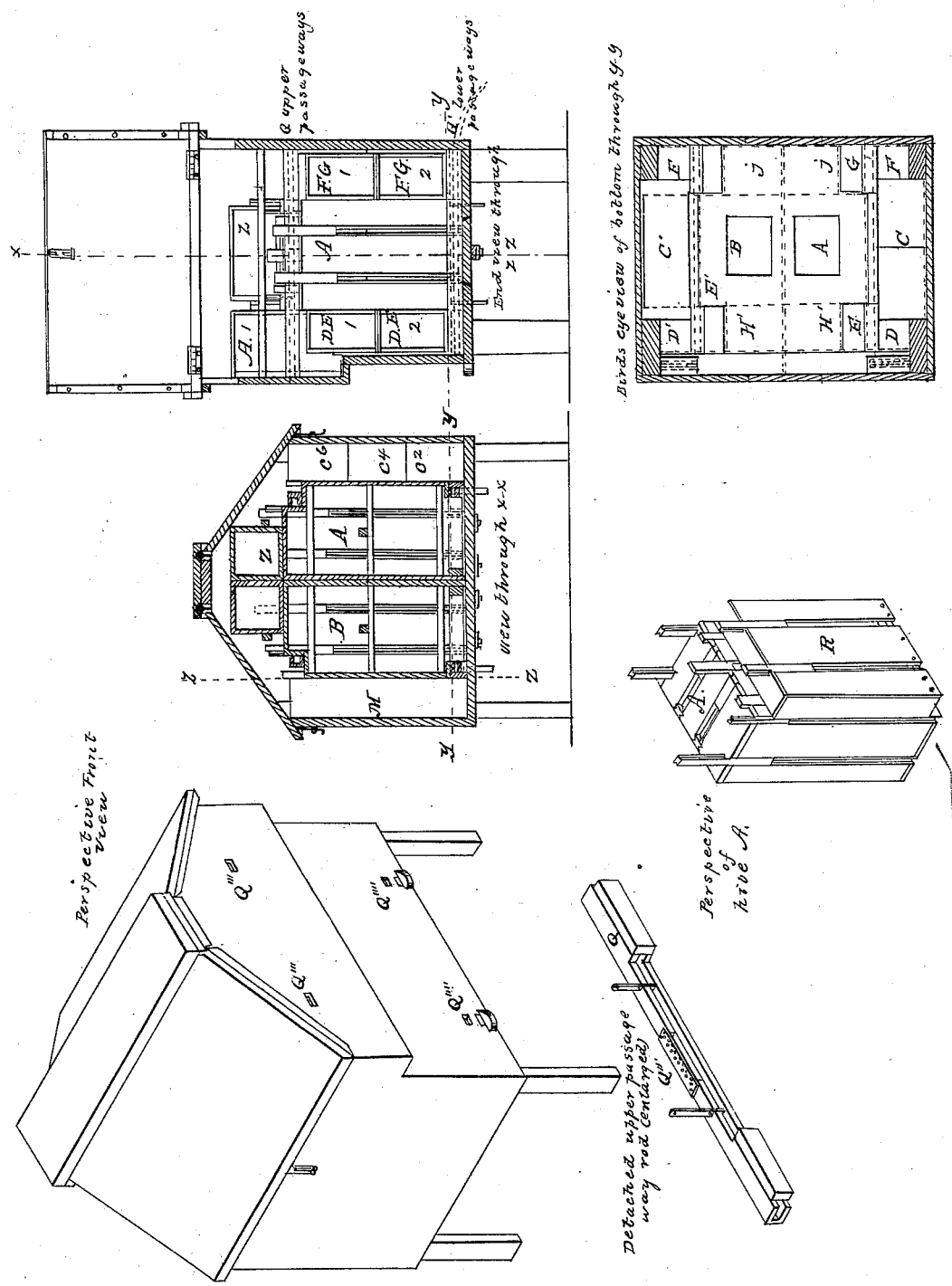

UNITED STATES PATENT OFFICE.

STEPHEN TITCOMB, OF FARMINGTON, MAINE.

BEEHIVE.

Specification of Letters Patent No. 6,285, dated April 10, 1849.

*To all whom it may concern:*

Be it known that I, STEPHEN TITCOMB, of Farmington, in the county of Franklin and State of Maine, have invented an Improved Method of Constructing a Bee House and Hive for the Protection and Use of the Honey-Bee.

This method of construction is believed to possess several advantages over any other now in use. These advantages consist in the first place in an easy method of cleansing the inside of the bottom of the hive from dead bees, or any other filth that may be collected there. Secondly, ventilators are introduced in such a manner as to supply the bees continually with pure air; thus by cleanliness and proper ventilation the life of the bees is preserved, especially in the winter, when without such precautions they are so apt to suffocate and die, even when they have a plenty of honey for their subsistence. Thirdly, the apertures or passages for the ingress and egress, are so contrived, as to give the home bees a fair chance to defend themselves against the attacks of foreigners, and effectually to drive off all those who may come to plunder them of their hard earned treasures of honey. Fourthly, provision is made, so that the bees may be amply and suitably accommodated with a place for the purpose of rearing their young. These advantages will become more apparent from the following description of the house and hive, and from the drawings which accompany the same.

The length of the house, measuring upon the inside, is 31½ inches; the width at the bottom is 22½ inches, which width continues the same up to a projection, which is 13 inches above the floor; the width is then increased by the said projection 2½ inches, and continues of the same dimension 6½ inches upward until it reaches the eaves. Here commences the roof—The height of the gable-end from the floor is 28¼ inches. The roof consists of two lids, one upon each side, suspended by hinges from the top-piece, and sloping downward from the top, and projecting over the sides and ends far enough to shed off rain or wet of any kind from the lower portion of the house. The top-piece is a board 29¾ inches long and 6 inches wide, placed horizontal upon the top of the roof.

The whole superstructure of the house is supported by four posts, 4 inches in width and 2 inches in thickness, one at each corner, about thirty three inches in length from the ground to the roof. To these posts the outside covering is firmly attached, the end pieces being fastened to the widest sides of the posts. The floor of the house is situated upon the posts at an elevation of 11 or 12 inches from the ground, so as to afford sufficient room for a person to reach under and open the doors, which are made at the bottom of the hives for the purpose of removing impure substances.

There are two principal hives, as will be seen by the drawings, marked A and B. The one marked A with the boxes appended to it is here only described. The other, with its appendages being precisely similar, is not described. Hive A is 20 inches high, and its sides are 12 inches by 10, in width, forming a rectangular building of four sides; in each of these sides there are two open spaces from the top to the bottom; and across the top two, also. Each of these spaces is ½ inch wide. These spaces or apertures are closed by slides when the bees are to be confined to the hive, which is their proper home; but when they are permitted to have access to the boxes annexed to the hive, the slides are removed for this purpose. The hive is open at the bottom, and placed upon the space A immediately over the door in the floor marked A. Passageways for the bees to go in and out of the hive are made in two rods, called the upper and lower rod Q and Q'. The apertures for the passage of the bees are one inch wide, and half an inch high. These rods Q, Q' extend from the outer entrance quite across the house in a horizontal direction with an opening where they pass the hive for the bees to enter therein. The lower rod has two passage ways; the upper one extends from end to end of the rod, and the lower passage extends from the outer entrance in front of the house half the length of the rod. The upper rod Q, is similar to the lower one Q' excepting that it has but one passage way for the bees extending through its whole length, and a ventilator in the center of its upper surface, which is made by an opening Q" of about three inches in length and one in width, out of the passage, and is covered with a piece of perforated tin plate.

Niches are made in the front part of the hive both at the bottom and the top, for the purpose of receiving the rods, before mentioned. The lower nich is made 2 inches in the perpendicular and 1½ inch in the horizontal direction, and is completely filled by the lower rod. The upper niche makes a cavity of 2 inches by 1¾ inch, so that it is not quite filled by the upper rod, a space of about ¼ of an inch is left for the slides, in the front and on the top of the hive, to pass over the said upper rod. On the space C on the floor in front of the hive are placed, as will be perceived by the drawings, two tiers of three boxes each, one above the other, marked with the same letter C, and numbered with the figures 2, 4, and 6. Said boxes are each 6½ inches high, and 6 inches by 5 the other ways. On the two blocks D and E, which are 2 inches thick, are placed two boxes, one upon the other, lettered D, E, and numbered 1, 2, each 8 inches high and the same dimensions the other ways, as the boxes lettered C. On the blocks F and G, directly opposite and similar to D and E, are two F G boxes one upon the other of the same size, and with the same figures as the D E boxes. On the space H are two boxes, one above the other, marked H, of the same size as the C boxes. On top of these is the box H with the figure 1. H is 13 inches high, and 7½ inches by 6 in the other dimensions, with a glass face. On I, stand two boxes I, one above the other of the same dimensions as the C boxes; on top of which is a box. This last box is 13 inches high and 6 inches by 5 the other ways, with glass face. On the top of the hive A is box L, 11½ inches long and 6 by 6 the other ways, with glass face also. Each of the long boxes may be exchanged for two short ones, similar to boxes J and K, adjacent to hive B, if found more convenient; and all of the six C boxes in front of hive A, may be exchanged for two, or one large one similar to M, placed on C', in front of hive B; and so may the four D E and F G boxes, be exchanged for two like standing by one side of the last mentioned hive; likewise either the two short H or the short I boxes may be made into one.

If it is desired, the number of the boxes may, in general, be diminished or increased, by enlarging or diminishing their size in the perpendicular and lateral directions; without changing the form or size of the house or hives; and as the glass faces to some of them are only inserted to satisfy curiosity in examining the work of the bees, they may be used or omitted, at pleasure. Moreover, to further satisfy curiosity, the wooden sides, of any or all of the lateral boxes, may readily be exchanged for glass.

The design of the boxes, is to give the bees room to enlarge their works farther than filling the original hive, and to obtain what honey they may lay up, that may not be necessary for their subsistence, without taking their lives or in any way injuring them. Accordingly the bees are admitted to the boxes by means of removing the slides attached to the hive, so that they may pass into each and all of them through the holes made in the sides of the boxes contiguous to the hive. When these boxes are filled with honey, they may be taken out one by one, at pleasure, without any molestation from the bees by shoving down the slides which will stop the communication, and confine the bees to the hive, which is their principal residence.

If it should be thought advisable to obtain new swarms of bees, on the dividing principle, rather than by the ordinary and more natural way of swarming, this may be done by means of large boxes, like M with slides attached to them. Young swarms, when sufficiently developed, if the weather is not so warm, as to cause them to lie out upon the outside of the house, will principally resort to such lateral boxes; and in them may be removed to a new house without difficulty. Before removing these boxes from the old house, their slides, as well as the slides in the hive contiguous to them should be put into their proper places. As soon as they can be properly adjusted in the new house, the slides should be taken out, to let the bees have access to the new hive. It will be well to have as many as three of these large boxes prepared to move at one time, one of them at least, as large as M, placed in front of hive B.

When this house is to be stocked with bees obtained in the ordinary way, they may be hived in the same way as in other hives, before the hive is put into the house. Immediately after the bees are placed in the hive, and the hive and boxes are adjusted to each other in their proper places within the house, the slides should be removed so as to give the bees access to the boxes. This will prevent them from covering the slides with wax. Such a precaution is necessary, because if the slides are covered with wax the communication from the hive to the boxes will be stopped and the slide can not be removed without breaking the comb. Through the front of the house apertures are made of sufficient dimensions to admit the bees to their passageways through the rods into the hive; and as there are two passageways in the lower rod, there must be two apertures to correspond to the same; and as there is but one passageway in the upper rod, only one aperture in the house is needed for that. Directly under these apertures, more especially the lower ones, it may be convenient and useful to affix small stools for the bees to light upon, and rest, when they come home weary and heavy laden, previous to their entering the hive. The apertures in the back side of the house should not be made more than half the size of those in front, because the bees usually go in and out the front side. On top of the house is placed a movable cap or cover—refer to it by letter—with ledges at the ends. This cap should be 8 inches wide, and of sufficient length for the ledges placed upon the under side to drop down over the ends of the top piece. Also in the under side of the cap near each lineal edge is a small groove, the design of which is to prevent the rain that may fall upon it from passing under the cover, thus preventing the water from entering the joints at the top of the house.

The cap when left in its place should be made secure by proper fastenings. In the inside of the house, and above the hives, two small horizontal bars are extended quite across the house from one gable end to the other; they are 12 inches apart and parallel to each other. The object of their insertion is to keep the upper boxes in their places when it is necessary to move the house. It will be perceived that a space of ¼ of an inch in width is left between the walls of the house and the boxes; the object of this is to facilitate the insertion and removal of the boxes; but when the boxes are left to remain in their places they are made to adhere to the hive by means of small keys or wedges driven between them and the walls. The bees may be confined to the hive, whenever it may be necessary for the purpose of moving them from one place or locality to another, or for any other cause, by cutting off the passageways in the rods about six inches from each end directly where the bees first enter the hive from the rod, by means of small pieces of perforated tin plate inserted, for that purpose, perpendicularly in the upper surface of the upper rod and in the floor of the house directly under the passageways of the lower rod. The upper pieces being shoved down in a perpendicular direction, and the lower ones upward in the same direction, through the floor the passages will be cut off at right angles, and all communication between the hive and outside of the house will be stopped. This method of confining the bees to the house will be better understood by means of the rods appended to the hive A.

What I claim is—

The manner of combining and arranging the upper and lower rods, or entrance passage with the main, or central hives as herein set forth; said rods, or passages, being long and narrow for the purpose before mentioned and so constructed that while the external communication is cut off the ventilation may still go on by the means herein above described.

STEPHEN TITCOMB.

Witnesses:
  JOHN M. PERKINS,
  J. WARREN MERRILL.